Figure 1:
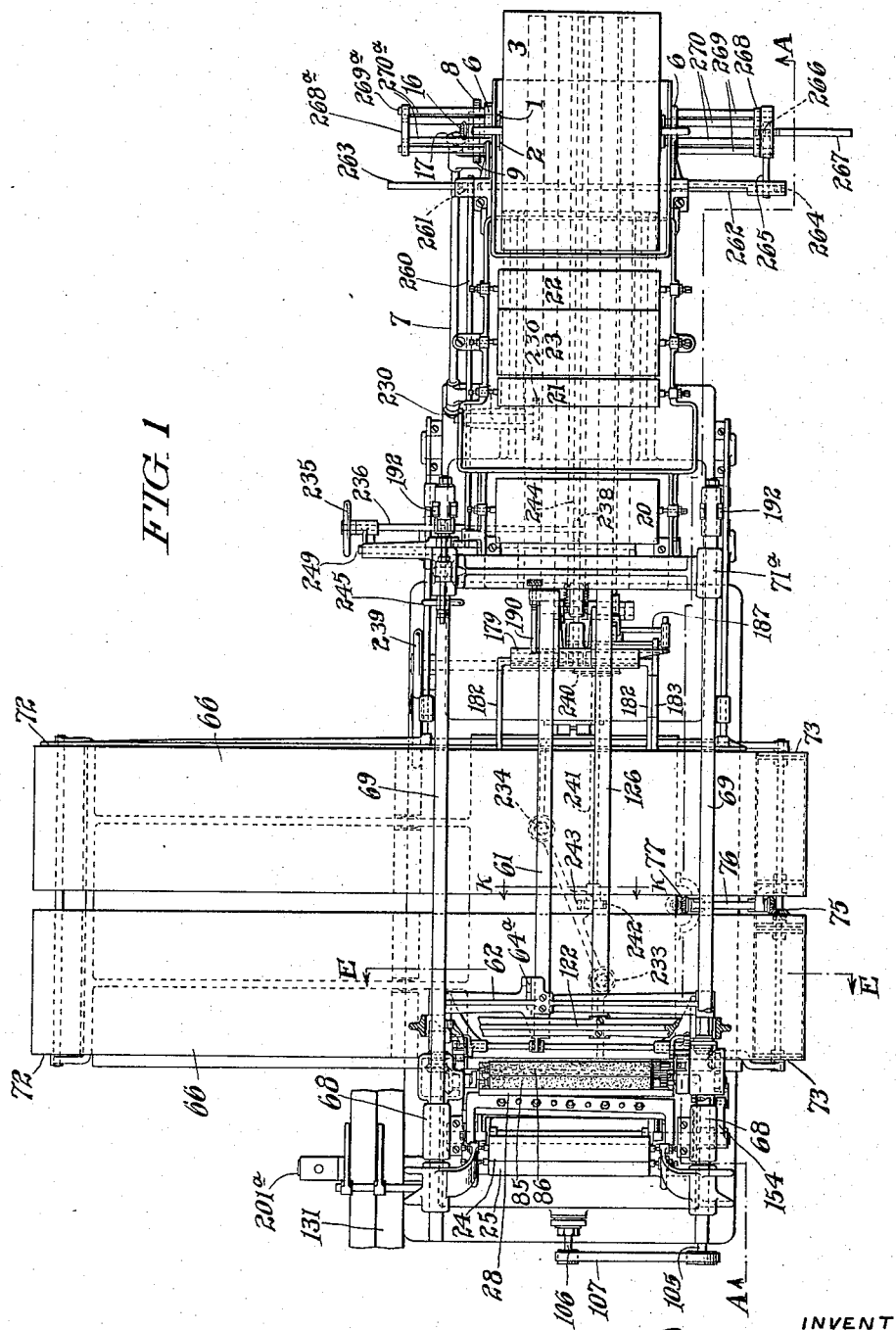

F. G. HENRY.
MACHINE FOR APPLYING PAPER TO THE TOPS OF BOXES AND OTHER ARTICLES.
APPLICATION FILED OCT. 17, 1912.

1,156,005.

Patented Oct. 5, 1915.
15 SHEETS—SHEET 1.

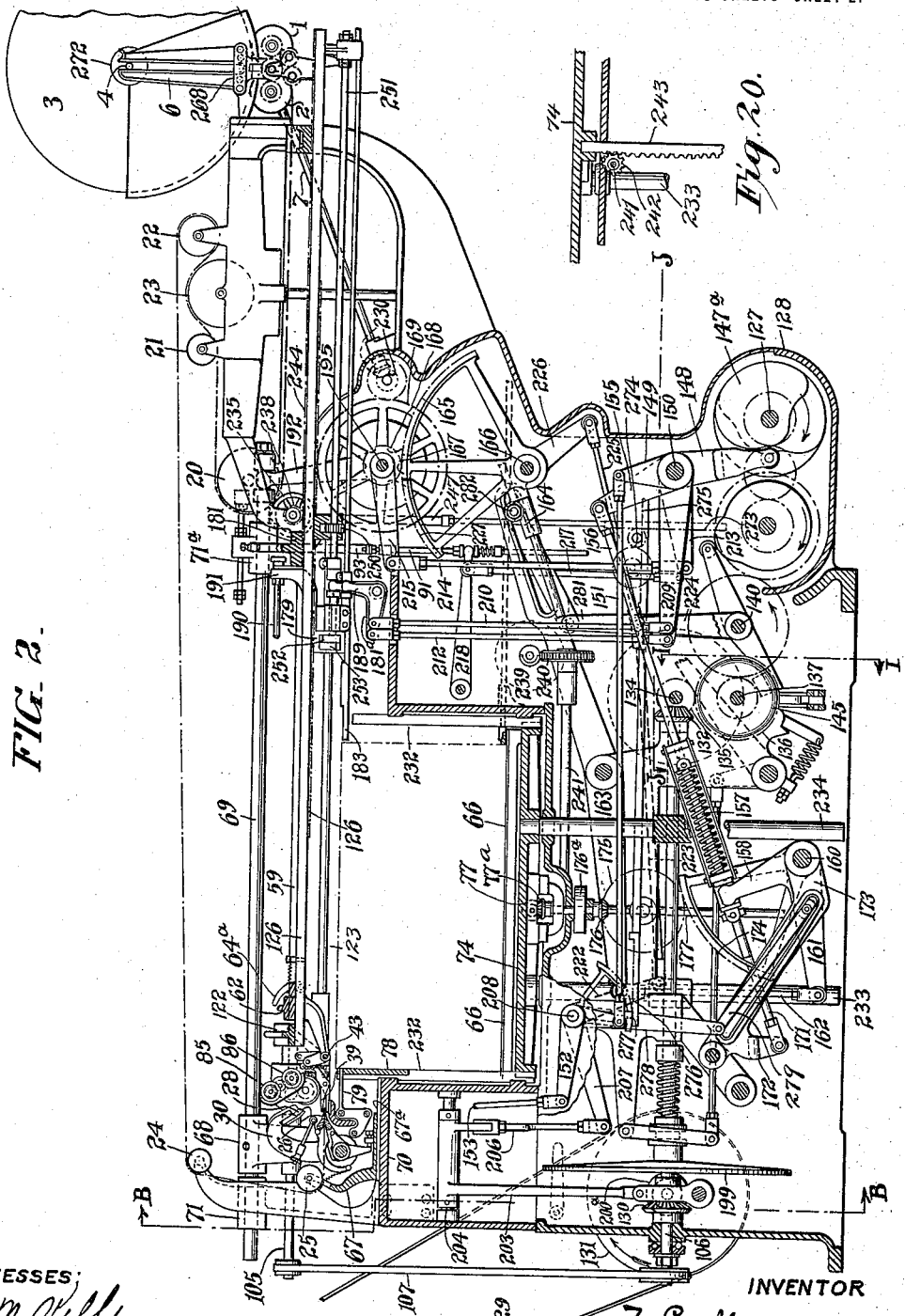

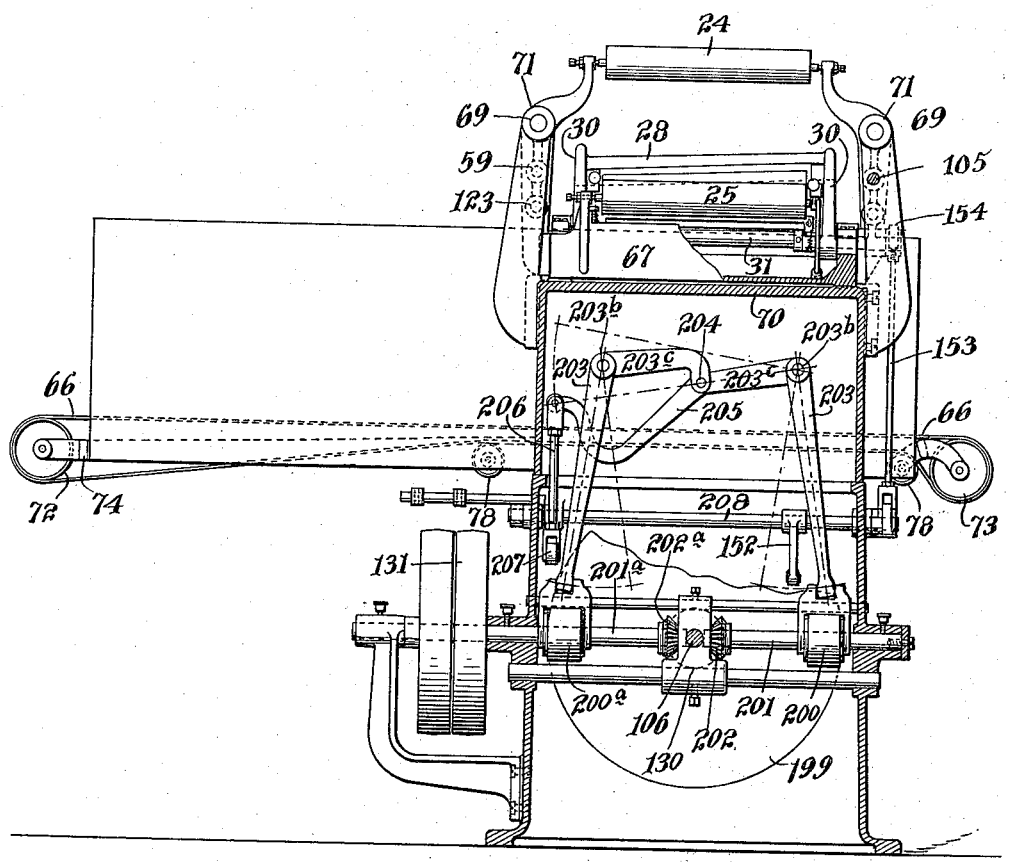

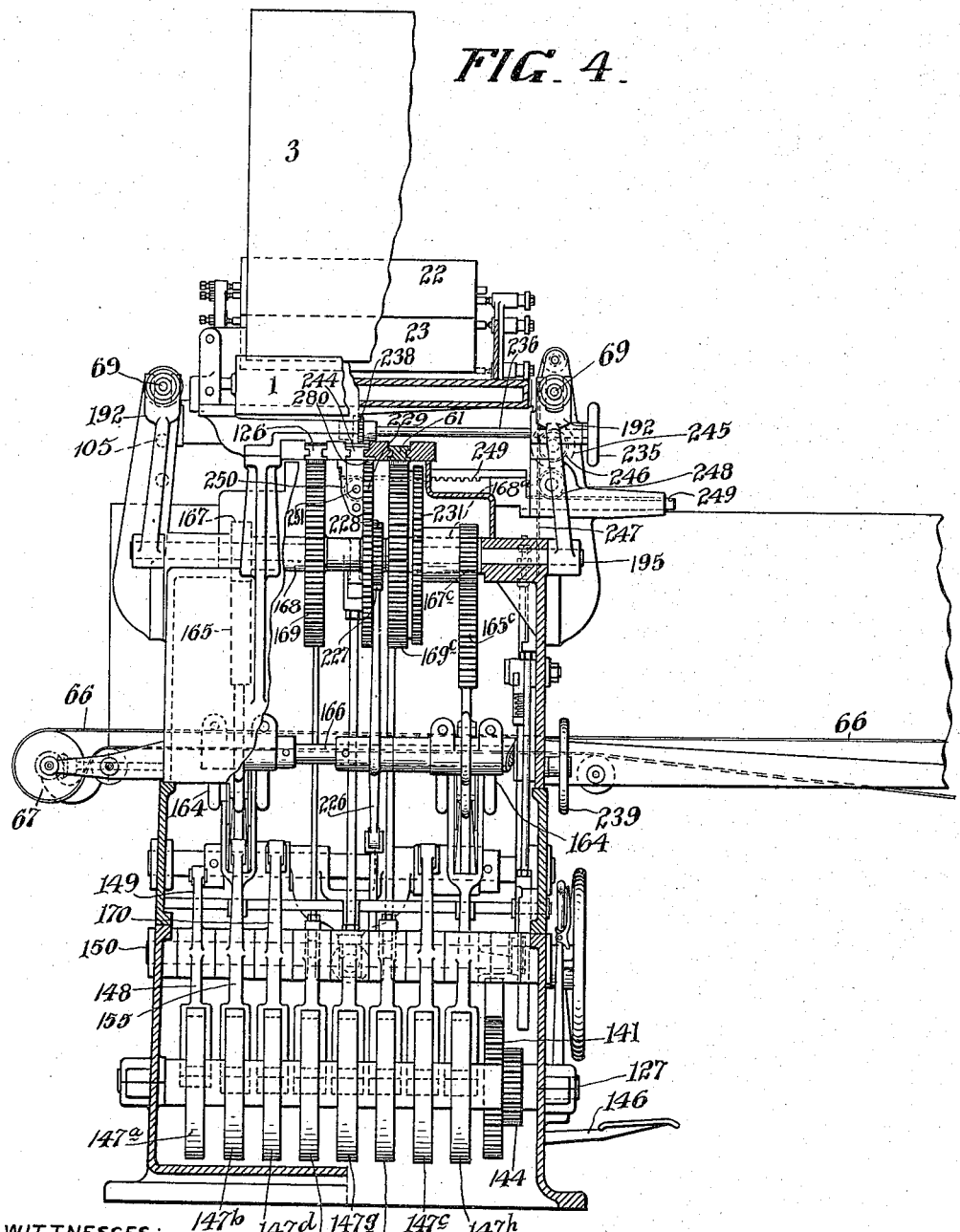

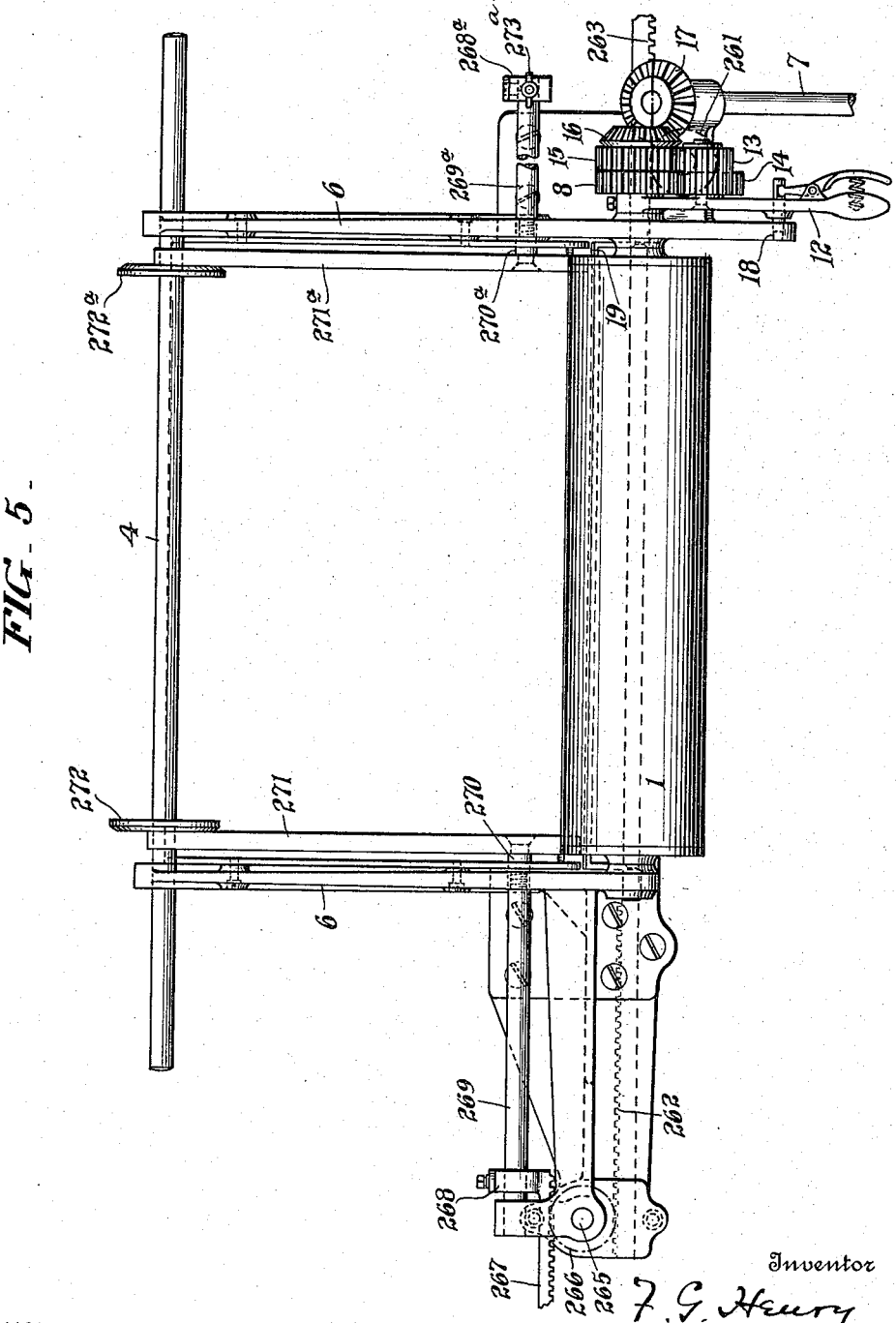

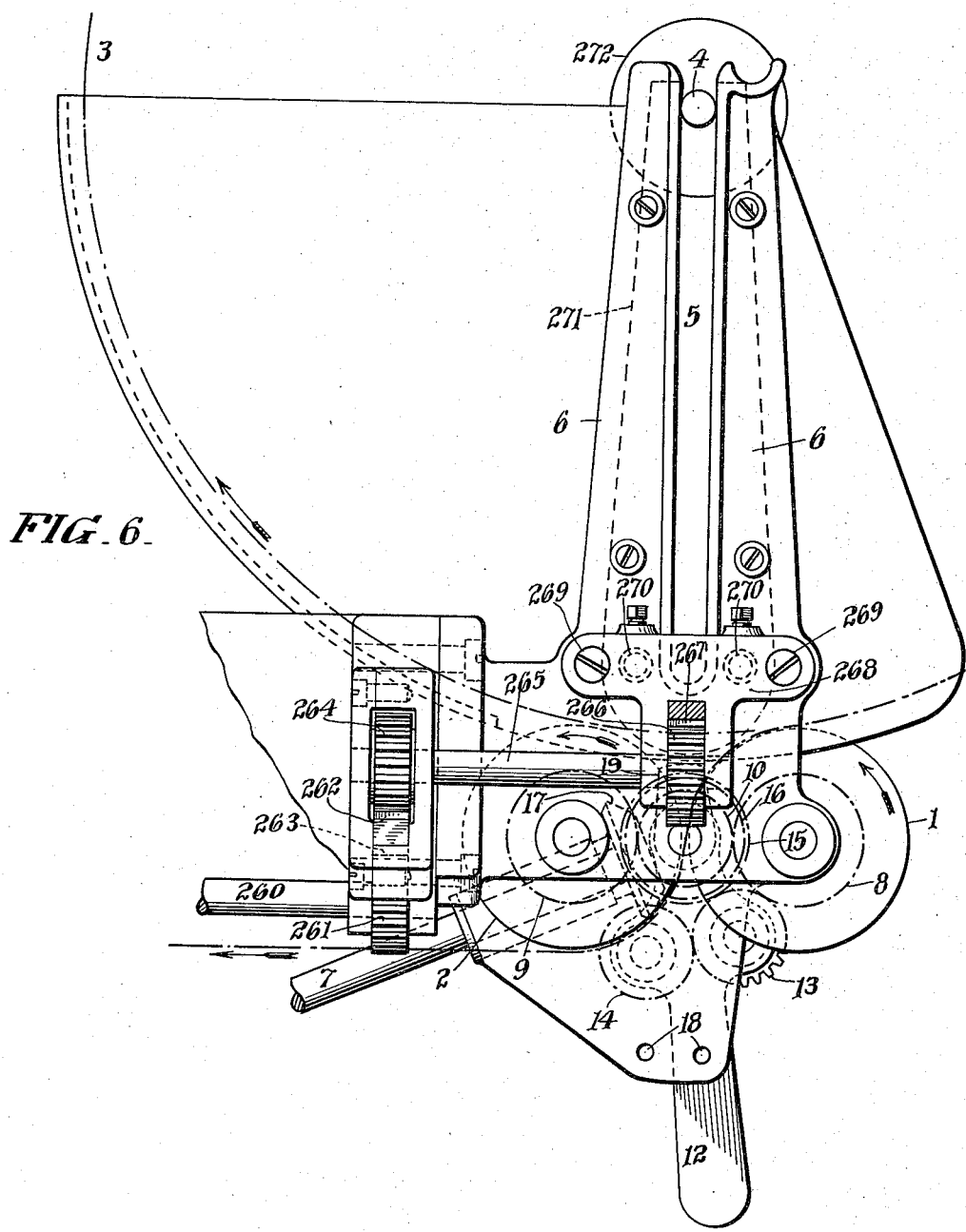

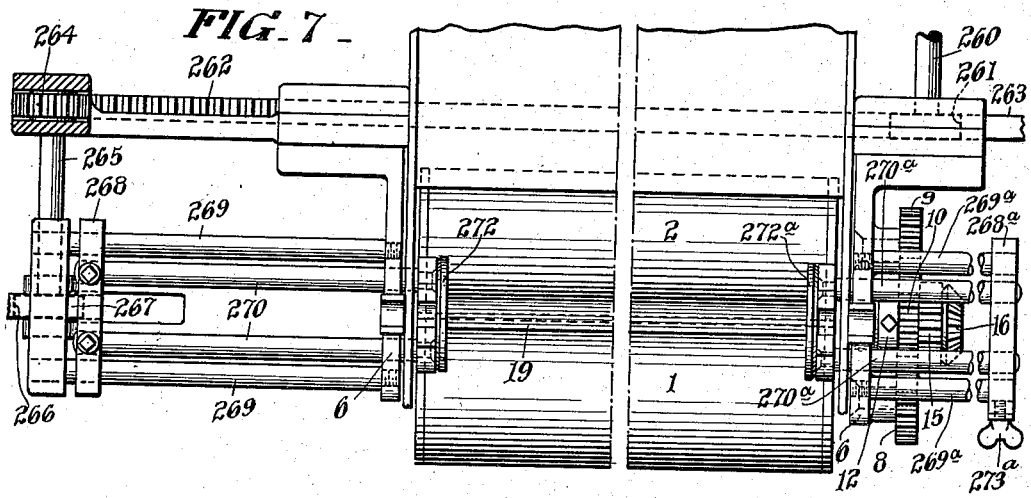
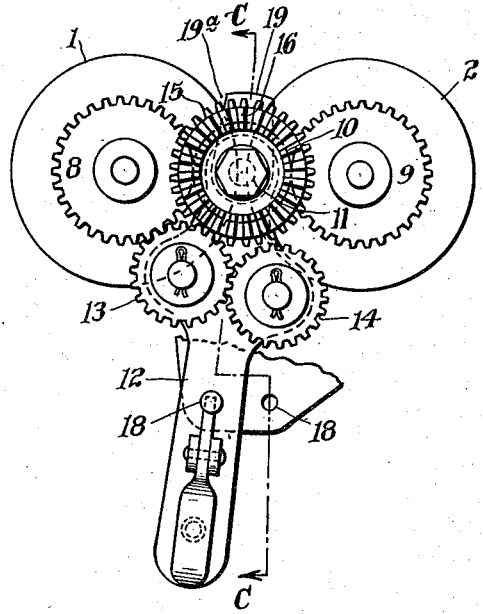
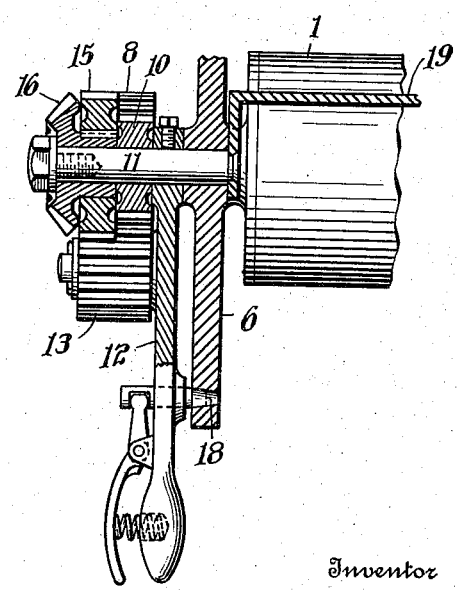

F. G. HENRY.
MACHINE FOR APPLYING PAPER TO THE TOPS OF BOXES AND OTHER ARTICLES.
APPLICATION FILED OCT. 17, 1912.
1,156,005.
Patented Oct. 5, 1915.
15 SHEETS—SHEET 8.
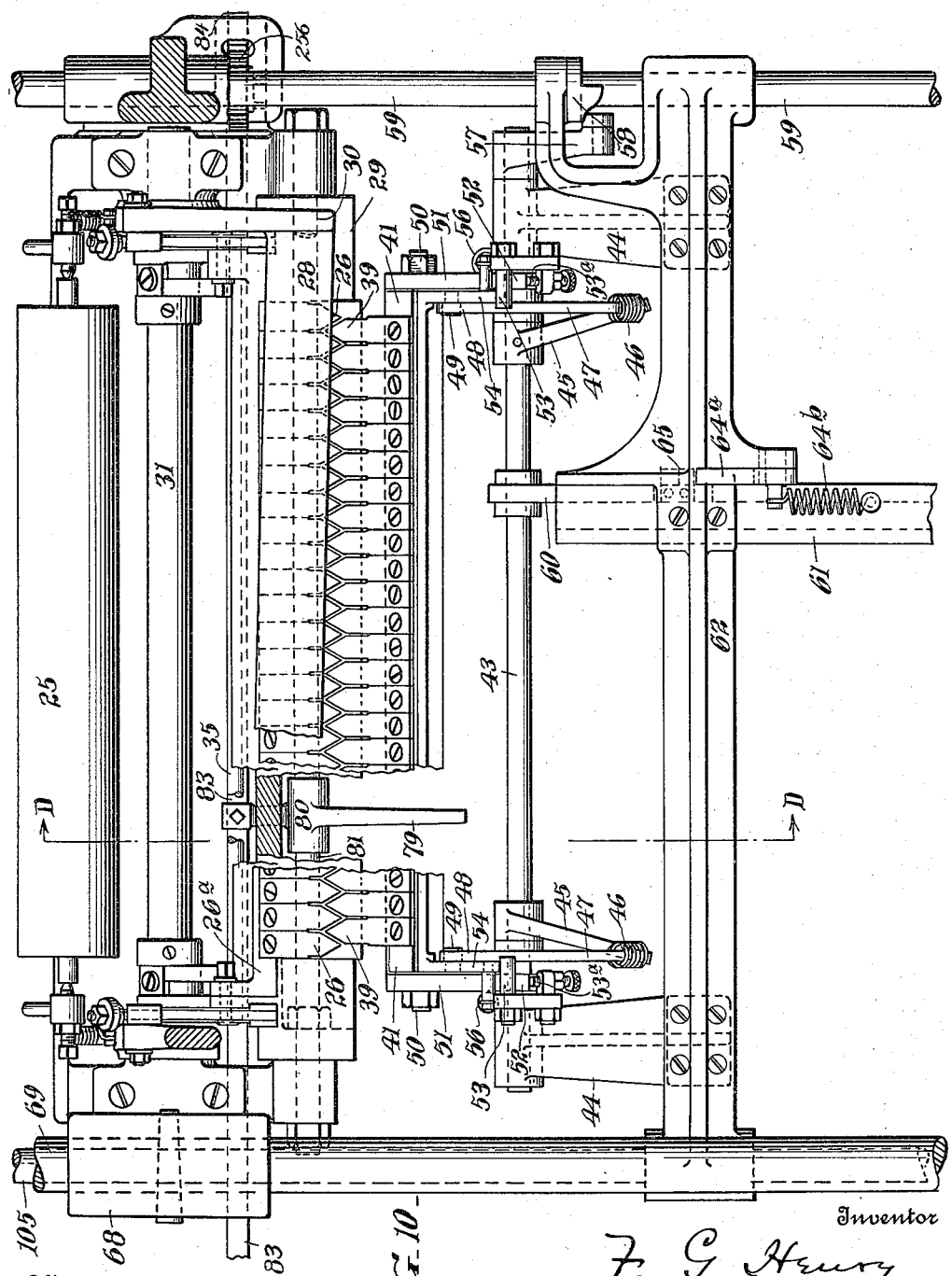

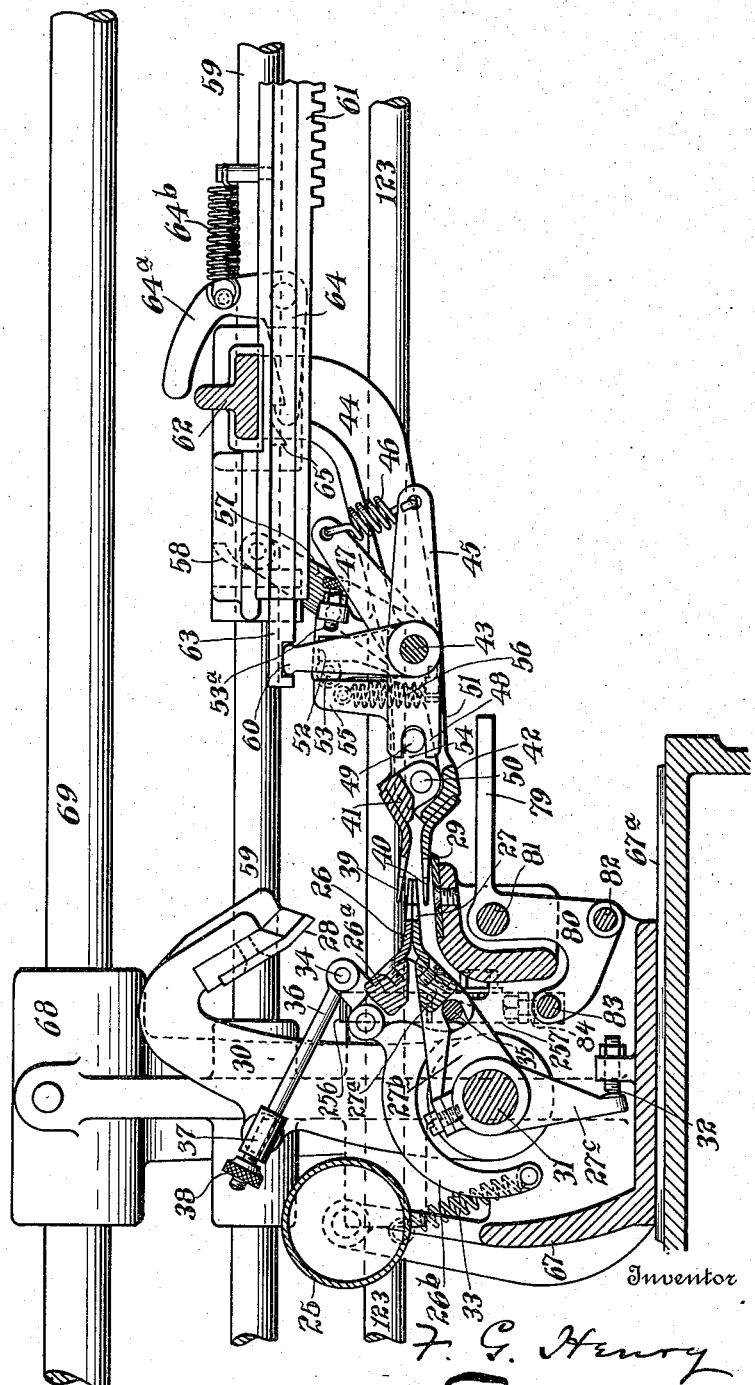

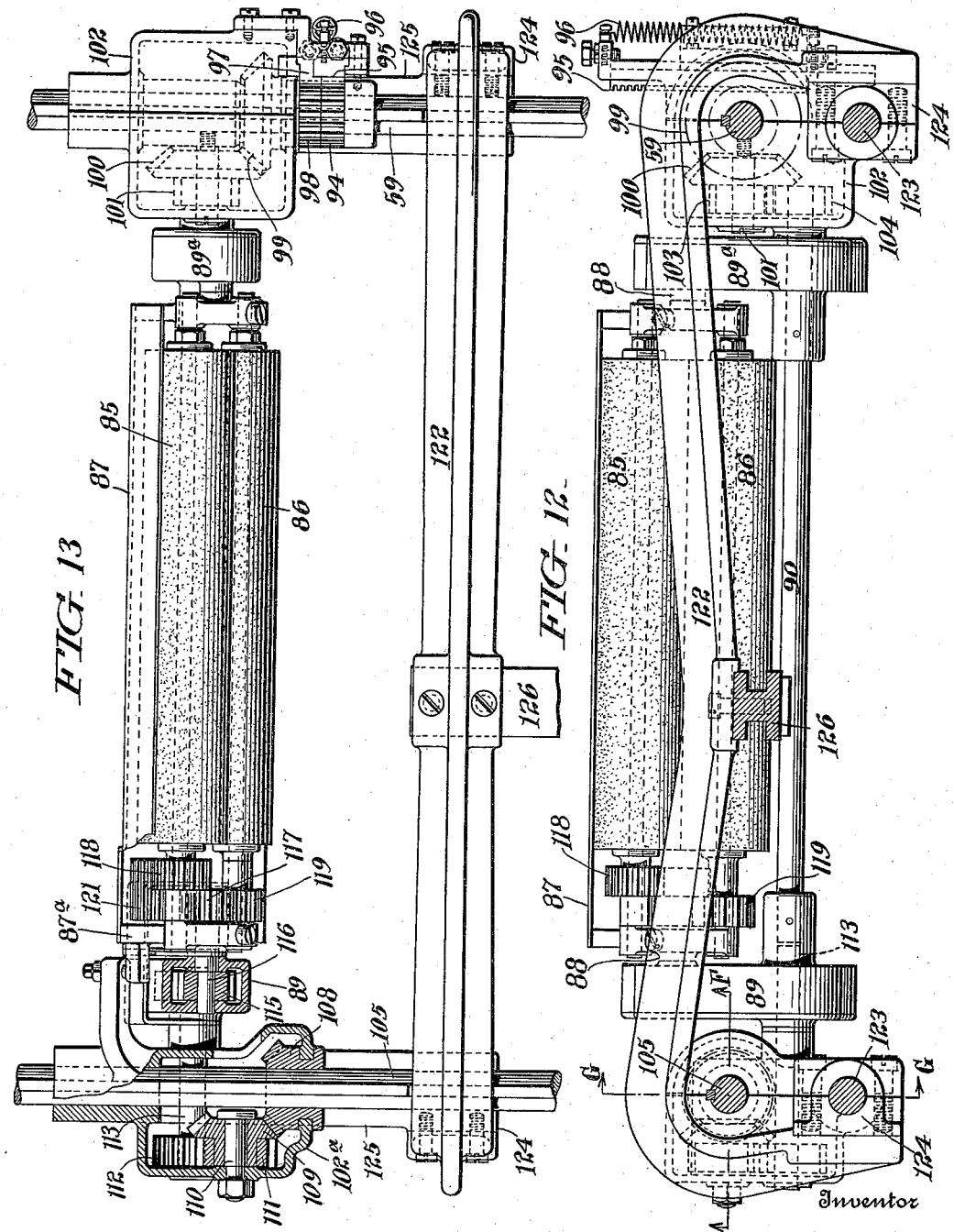

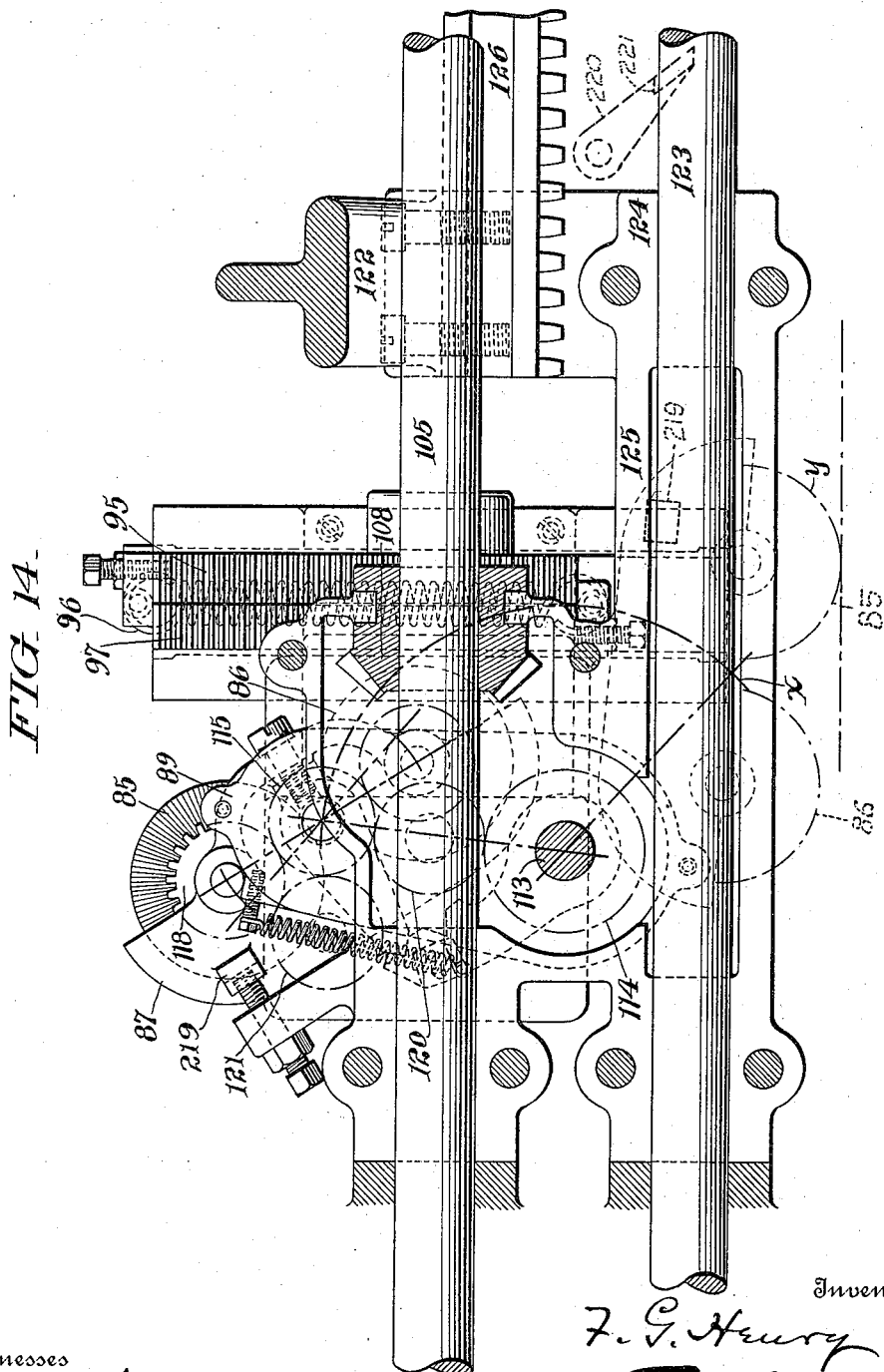

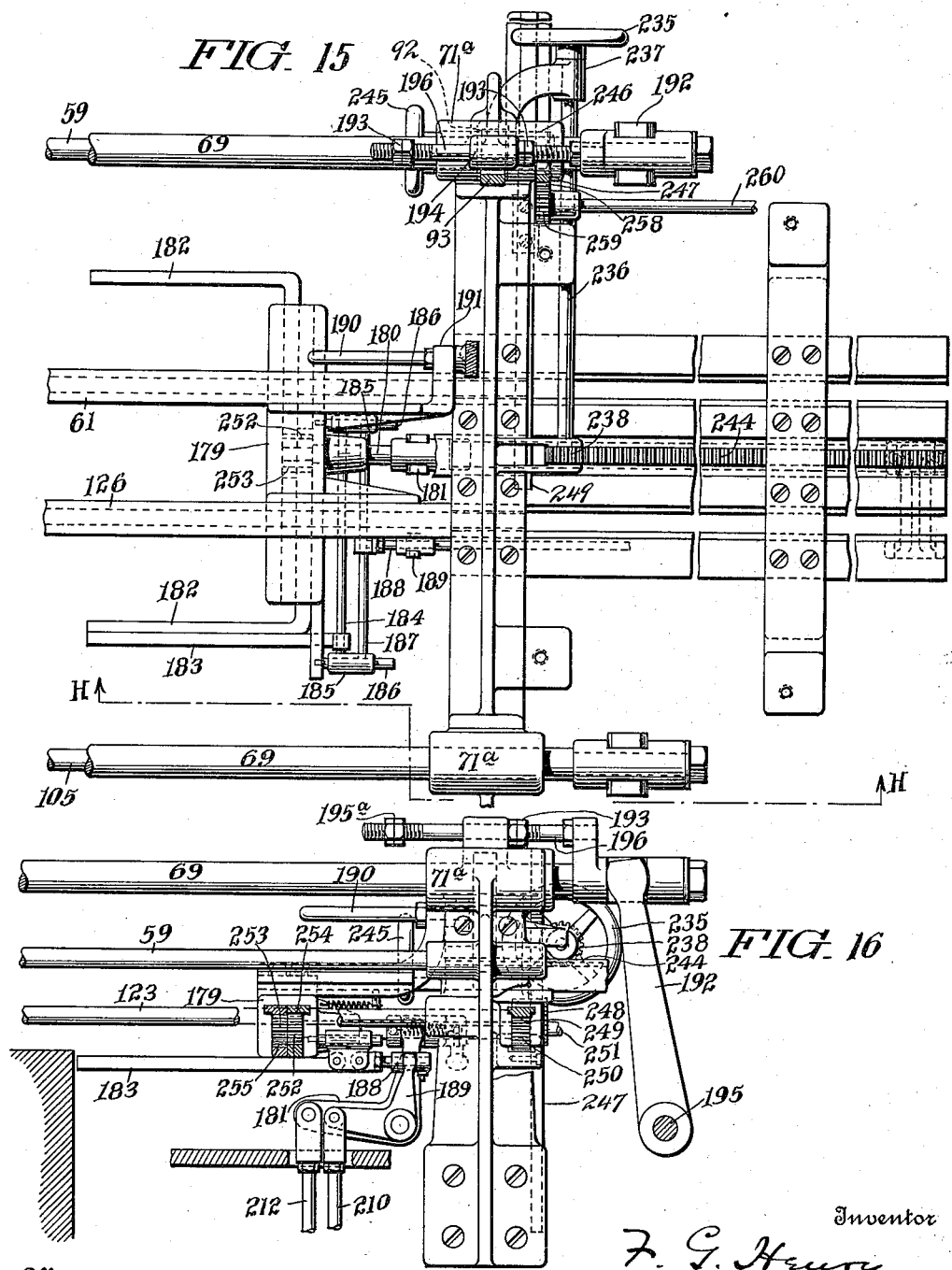

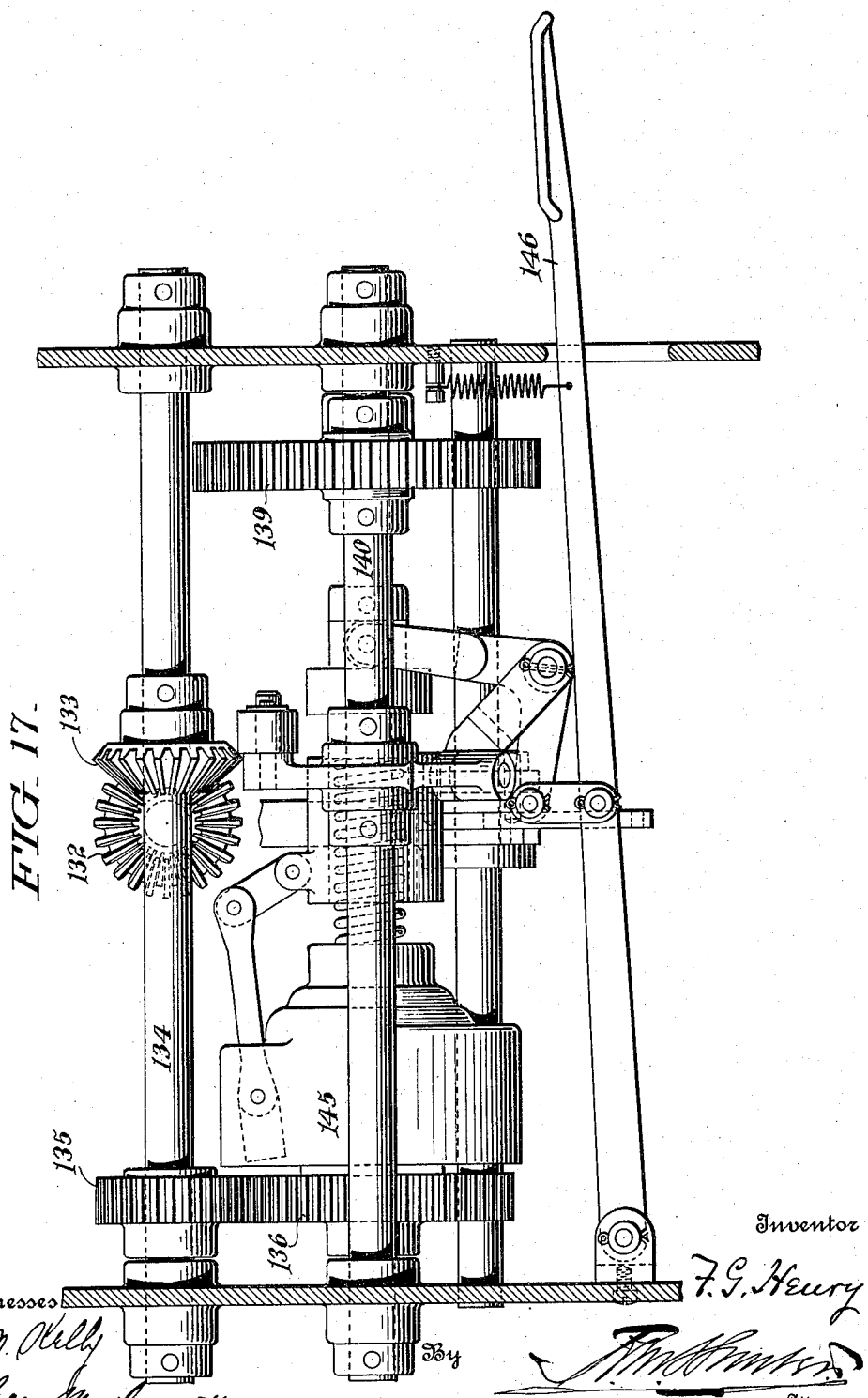

F. G. HENRY.
MACHINE FOR APPLYING PAPER TO THE TOPS OF BOXES AND OTHER ARTICLES.
APPLICATION FILED OCT. 17, 1912.

1,156,005.

Patented Oct. 5, 1915.
15 SHEETS—SHEET 14.

F. G. HENRY.
MACHINE FOR APPLYING PAPER TO THE TOPS OF BOXES AND OTHER ARTICLES.
APPLICATION FILED OCT. 17, 1912.
1,156,005.
Patented Oct. 5, 1915.
15 SHEETS—SHEET 15.
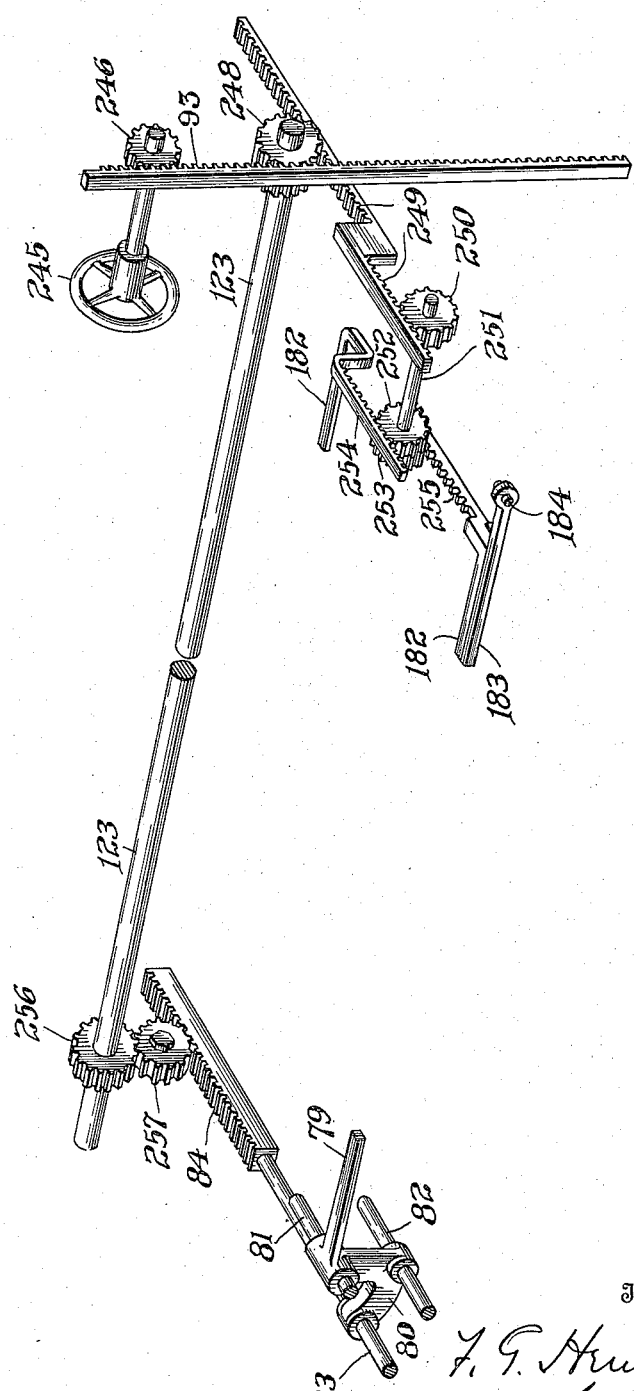

UNITED STATES PATENT OFFICE.

FERDINAND G. HENRY, OF PHILADELPHIA, PENNSYLVANIA, ASSIGNOR TO CHARLES BECK, CHARLES J. BECK, LEON BECK, ANNIE S. BECK, HORTENSE P. BECK, AND ANDREW SIMON, ALL OF PHILADELPHIA, PENNSYLVANIA, COPARTNERS TRADING AS CHARLES BECK COMPANY, OF PHILADELPHIA, PENNSYLVANIA.

MACHINE FOR APPLYING PAPER TO THE TOPS OF BOXES AND OTHER ARTICLES.

1,156,005.  Specification of Letters Patent.  Patented Oct. 5, 1915.

Application filed October 17, 1912. Serial No. 726,208.

*To all whom it may concern:*

Be it known that I, FERDINAND G. HENRY, citizen of the United States, and resident of Philadelphia, county of Philadelphia, and State of Pennsylvania, have invented an Improvement in Machines for Applying Paper to the Tops of Boxes and other Articles, of which the following is a specification.

It is the object of this invention to apply paper to the tops of boxes and other articles by means of a machine, in which the boxes may be fed successively, and the paper may be applied from a roll in the form of a continuous web cut into proper lengths as it is applied to each box.

It is also an object of my invention to provide an adjustability by which the machine may be easily and quickly adjusted for applying tops to boxes of different sizes.

In the drawings:—Figure 1 is a plan view; Fig. 2 is a section on line A—A of Fig. 1; Fig. 3 is a section on line B—B of Fig. 2; Fig. 4 is an end elevation partly in broken section; Fig. 5 is an end elevation of the paper tower on an enlarged scale; Fig. 6 is a side elevation of the paper tower; Fig. 7 is a plan view of the paper tower; Fig. 8 is an enlarged detail of the gearing of the paper tower; Fig. 9 is a section on the line C—C of Fig. 8; Fig. 10 is a plan view of the paper grippers parts being shown in section; Fig. 11 is a section on the line D—D of Fig. 10; Fig. 12 is an elevation of the rubbing roll mechanism, the guide and driving shafts being shown in section; Fig. 13 is a plan view of the mechanism shown in Fig. 12, the part in section being taken on the line F—F of Fig. 12; Fig. 14 is a section of the rubbing roll mechanism on the line G—G of Fig. 12; Fig. 15 is a plan view of a part of the mechanism showing in detail the box clamping and hand adjusting features; Fig. 16 is a section on the line H—H of Fig. 15; Fig. 17 is a sectional detail of the clutch and gearing mechanism taken on the line I—I of Fig. 2; Fig. 18 is a sectional plan view of the cam and gear mechanism taken on the line J—J of Fig. 2; Fig. 19 is a perspective view of the devices for adjusting the stop fingers; and Fig. 20 is a vertical section on the lines K—K of Fig. 1.

1 and 2 are the driven rolls between which the paper is fed from the roll 3. The roll of paper is carried by a spindle 4 which is fitted in vertical slots 5 in housings 6 on the sides of the machine, so that the surface of the paper will rest upon the feed rolls 1, 2 and the end will remain in contact therewith as the diameter of the roll is reduced by the feeding of the paper.

The feed rolls 1 and 2 are driven by a shaft 7 through intermediate gearing. It is desirable that provision should be made for feeding the paper from the roll in either direction, according to the surface which it is desired to present uppermost, when the paper is applied to the box, and for this purpose the reversible gearing shown is employed. On the ends of the shafts of the feed rolls 1 and 2 are gears 8 and 9 respectively, and these are geared together by an intermediate gear 10 on a loose shaft 11.

Pivoted on the shaft 11 is a lever 12 which carries two gears 13, 14, so arranged that when the lever is shifted from one position to the other (determined by the usual stops 18) the gear 13 will engage the gear 8 of the roller 1, or the gear 14 will engage the gear 9 on the roller 2. One of these gears, as 13, is a wide gear and is in constant engagement with a gear 15 which is keyed to the bevel gear 16 on the shaft 11. This bevel gear 16 is driven by the bevel gear 17 on the shaft 7.

When the lever 12 is thrown to the right, as in Fig. 6, the gear 13, which is driven by the gear 15 on the shaft 11, will be in mesh with the gear 8 of the roller 1 and will drive the roller 1 in the direction indicated by the arrow, while the roller 2 will be driven in the opposite direction through the intermediate gear 10. Under such conditions the paper will be fed from the roll 3 in the direction from right to left in Fig. 6 by the feed roll 1.

When the position of the lever 12 is reversed the gear 14 will be brought into engagement with the gear 9 of the roller 2 and as this gear 14 is driven from the gear 15 through the gear 13 the roller 2 will be driven in the opposite direction to that before described and the paper will now be fed by the feed roll 2 from the roll 3 in a direction from left to right in Fig. 6.

To guide the free edge of the paper in the proper direction down over whichever of the feed rolls 1 and 2 is in action, I employ a shutter 19, which is in the form of a bar extending transversely between the rolls 1 and 2 and secured at one end to the shaft 11, with the other end journaled in the frame 6 at the opposite side of the machine. When the lever 12 (which is fast on the shaft 11) is rocked to shift the gears 13 and 14 and bring either the feed roll 1 or 2 into action the shutter 19 will be rocked correspondingly into contact with one feed roll and out of contact with the other. Thus in Fig. 8 the shutter 19 is in contact with the roller 2 and out of contact with the roller 1, which is now the driven roll, and the edge of the paper from the roll 3 will be guided through the gap 19$^a$ down about the driven roller 1, its passage about the roller 2 being prevented.

From the feed-roll 1 or 2, as the case may be, the paper passes about the drum 20 and thence back about the guide rolls 21 and 22 and over the pasting roll 23, by which the paste is applied to the under side. Thence the paper travels, with the pasted side uppermost to the other end of the machine about the guide rolls 24, 25 to the gripping and cutting devices (see Fig. 2).

The gripping and cutting devices are shown more particularly in Figs. 10 and 11. 26 and 27 are upper and lower gripping jaws between which the paper is drawn with its pasted side down after it has passed about the guide-roll 25. 28 is the movable cutter, and 29 is the stationary cutter, located below the jaws 26, 27 with its edge slightly in advance of them. The movable cutter is carried by arms 30 on a rock-shaft 31.

The jaws 26 and 27 are serrated and are carried respectively by bars 26$^a$ and 27$^a$. The lower bar 27$^a$ is provided at its ends with arms 27$^b$ which are journaled on the rock-shaft 31 and also with arms 27$^c$ which are adapted to make contact with adjustable stops 32 on the frame 67 to limit the upward motion of the jaw 27.

The bar 26$^a$, which carries the upper jaw, 26, is provided with arms 26$^b$ which are journaled on a shaft 35 carried by the arms 27$^b$ of the lower bar and jaw and extend rearwardly, having their ends connected by springs 33 with the frame.

Hinged at 34 to the arms 26$^b$ are rods 36 which slide through sleeves 37 on the rocking arms 30 of the cutter 28, and these rods are provided on their ends with adjustable nuts 38. When the cutter 28 and its arms 30 are raised to their highest position (slightly beyond that shown in Fig. 11) the sleeves 37 strike the nuts 38 and pull the rods 36 back. This causes the arms 26$^b$, which carry the bar 26$^a$ and the upper jaws 26, to move back against the tension of the springs 33 on the shaft 35 as an axis. This movement is possible because the arms 27$^c$ are in contact with the stops 32 so that the arms 27$^b$ and the shaft 35 are for the time stationary. This lifts the upper jaw 26 so that the edge of the paper may pass between it and the lower jaw 27. When the arms 30 start to move forward the sleeves 37 are moved out of contact with the nuts 38, and this permits the rods 36 and the arms 26$^b$ to move forward under the action of the springs 33, thus lowering the upper jaw 26 into clamping action on the lower jaw 27 and gripping the edge of the paper.

The gripping jaws 26, 27, together with the cutters 28, 29 and the guide-roll 25 and the operating means described, are all carried on a slide 67 movable on guides 67$^a$ of the main frame 70. The slide 67 is provided with arms 68 which are secured to reciprocating rods 69, so that as the rods 69 are moved in their bearings 71, 71$^a$, the slide 67 and the devices carried by it will be reciprocated. The purpose of this is explained hereafter. The reciprocating gripping jaws 39 and 40 then come into action to grip the edge of the paper held by the jaws 26 and 27. These jaws are also serrated and are so arranged as to pass between the serrations of the jaws 26, 27, as is shown in Fig. 10. The upper jaw 39 is carried by a bar 41 and the lower jaw by a bar 42, and these bars are pivoted together at their ends at 50. Extending rearwardly from the ends of the lower bar 42 are bell-cranks 51—52 pivoted on the transverse shaft 43. The upper ends 52 of these bell-cranks work between the stops 53, 53$^a$ which thus limit the movement of the bell-cranks on the shaft 43 and the resulting movement of the lower jaw 40. One of the stops, as 53$^a$, may be made adjustable as shown.

Extending rearwardly from the ends of the bar 41 of the upper jaw are arms 54 which carry pins 49 and upward extensions 55 which are connected by springs 56 with the parts 51 of the bell-crank extensions of the bar of the lower jaw. The shaft 43 is journaled in brackets 44 from the cross-bar 62 which is movable longitudinally by means of a rack 61. Journaled on the shaft 43 are levers 47 having their inner ends 48 forked and engaging the pins 49 on the arms 54 and their outer ends connected by springs 46 with arms 45 fast on the shaft 43. On the end of the shaft 43 is an arm 57 which is actuated by a cam 58 on the longitudinal shaft 59. Also carried by the shaft 43 is an arm 60 which engages a notch in a slide 63 movable in the rack 61 and provided with a lug 65 which is adapted to snap under a spring catch 64 carried by the rack 61.

The operation of these gripping devices is as follows: Supposing the edge of the paper to be gripped between the stationary jaws 26 and 27 and the traveling jaws 39 and 40 to be open as shown in Fig. 11. As the shaft 59 rotates the cam 58 acts on the arm 57 and rocks the shaft 43. The arm 45 moving with the shaft puts the springs 46 under tension and causes the levers 47 to rock, thereby rocking the upper jaw through the medium of the pins 49. This operation causes an upward movement of the arms 55 which, through the springs 56, rock the bell cranks 51—52 on the shaft 43 and raise the lower bar 42 and jaw 40. The jaws 39 and 40 are thus clamped together on the paper, the serrations of the traveling jaws 39 and 40 fitting the serrations of the fixed jaws 26 and 27 as shown in Fig. 10. At the same time the arm 60 on the shaft 43 acting on the slide 63 has pushed it forward until the lug 65 snaps under the catch 64. The shaft 43 and the gripping jaws 39, 40 are then locked in clamping position on the edge of the paper and ready to carry it forward over the top of the box when the jaws 26 and 27 are opened and the rack 61 moves forward. The release of the paper by the fixed jaws 26, 27 is effected by the upward movement of the arms 30 of the rocking cutter 28, which causes the slides 37 to strike the nuts 38 on the rods 36, thereby rocking the arms 26ᵇ on the rod 35 as an axis and lifting the upper bar 26ᵃ and jaw 26 to release the paper and permit it to be drawn forward over the box by the movable jaws 39 and 40.

The boxes are fed in succession by traveling belts 66 which pass about rolls 72, 73 mounted at the ends of a frame 74 extending transversely through the machine. The rolls 73 are driven intermittently by gears 75 from a counter-shaft 76 driven by bevel-gears 77, 77ᵃ. The belts 66 are arranged below the gripping jaws and rubbing rolls so as to bring the boxes one at a time in position to have the paper applied.

78 is a fixed stop or guide-wall extending transversely under the gripping jaws and rubbing rolls against which the inner side of the boxes rest while the paper is being applied. This stop insures the boxes coming in proper position with reference to the devices for applying the paper.

79 is a finger carried by the slide 67 and adapted, when the slide is moved forward to project through the guide-wall 78 in front of the box and stop it. As shown the finger is carried by a frame 80 guided on the transverse rods 81, 82 and fastened to a movable rod 83 which is provided on its end with a rack 84 by which it may be shifted by suitable gearing. By the movement of the rack 84 and rod 83 the finger 79 may be shifted transversely to suit the size of the box which it is to stop.

In front of the movable cutter 28 and above the grippers are the rubbing rolls 85, 86 which are carried in a rocking frame 87 in which they are journaled at their ends. The ends of the frame 87 are journaled in hollow cases 89, 89ᵃ on a shaft 90 which extends transversely part way across the top of the machine. This shaft at one end extends through the case 89ᵃ and is rocked by suitable gearing from a shaft 59 heretofore referred to, which carries the cam 58 for controlling the traveling clamping jaws of the gripping devices. This shaft carries a pinion 92 and is rocked by a rack 93 reciprocated by the rod 91 (see Figs. 2 and 15).

The gearing for rocking the brush-case from the shaft 59 and also for rotating the brushes is best shown in Figs. 12, 13 and 14.

94 is a pinion keyed to the shaft 59 and this engages a vertical rack 95 which is connected by a spring 96 with a second rack 97, which in turn engages a pinion 98 loose on the shaft 59. Carried by this pinion is a bevel gear 99 which engages a bevel-gear 100 on a short shaft 101 in the gear case 102 and this bevel-gear carries a pinion 103 which engages and drives a gear 104 on the end of the shaft 90 which carries the brush-case. As the shaft 59 rocks the pinion 94 moves the rack 95 and when the tension thus imposed upon the spring 96 is sufficient the rack 97 is moved thus rotating the pinion 98 and rocking the shaft 90 and brush-case 87 through the gearing 99, 100, 103 and 104. This causes the brush-case to rock the arc indicated in dotted lines at $x$ in Fig. 14 bringing the upper brush 85 in contact with the top of the box which is passing under it as indicated in dotted lines at $y$ in Fig. 14.

The brushes are constantly rotated in opposite directions by the gearing at the other end which, as shown is as follows: 105 is a longitudinal shaft extending parallel with the shaft 59 and driven from the driving shaft 106, by a suitable belt 107. Keyed to the shaft 105 is a bevel gear 108 which drives a bevel-gear 109 on a short shaft 110 in the gear casing 102ᵃ. This bevel-gear 109 carries a pinion 111 which drives a gear 112. This gear is carried by a short shaft 113 which projects into the case 89 in line with the shaft 90 (see Fig. 12). On the shaft 113 within the case 89 is a pinion 114 which drives a gear 115 through an idler 120. The gear 115 is on a short shaft 116 extending through the end 87ᵃ of the brush-casing 87 and carries a gear 117 which engages a gear 119 on the shaft of one of the brushes, as 86, and also with a wide pinion 121 which meshes with the gear 118 of the other brush.

122 is a frame extending transversely across the machine and provided on its ends with guides 124, 124 which are adapted to slide on the longitudinal guide rods 123, 123. The gear-cases 102, 102ᵃ of the brushes are connected by extensions 125 with the guides 124 so that the reciprocation of the brushes will be produced by the reciprocation of the cross-frame 122. Extending longitudinally from the cross-bar 122 is a rack 126 by which the cross-bar is reciprocated. When the cross-bar 122 moves forward the arms 89 are rocked in the manner described to bring the rotating brush 85 in contact with the paper and on the return movement of the cross-bar the brush-casing 87 is rocked on the arms 89 to lower the brush 86 in contact with the paper while the brush 85 is lifted. This is effected by means of a lug 219 carried by the brush-case and adapted to pass under a pivoted dog 220 carried by the main frame. This pivoted dog has an inclined face 221 extending up for a short distance only. As the brushes move forward with the brush 85 in action the lug 219 on the brush-case acting on the back of the dog lifts it and passes under, but on the return movement the lug striking the front of the dog will ride up the inclined face 221 and tilt the brush-case on its axis 88 so as to raise the brush 85 and lower the brush 86.

At the side of apron 66 opposite to the stop 79 the cutter and stationary grippers is a box stopping mechanism to act in conjunction with the stop 79 in arresting the box and to hold it immovable against the guide 78 while the paper is being applied. These devices are shown more particularly in Figs. 1, 2, 15 and 16.

179 is a reciprocating frame provided with a rod 180 supported and guided in the cross bar 181 of the main frame which carries the guide 71$^a$, 71$^a$ for the rods 69, 69. The frame 179 is reciprocated by a bell-crank 181$^a$ having a forked end engaging collars on the rod 180. Carried by the frame 179 are fingers 182, 182, adapted, when projected to impinge against the side of the box near its outer edges at the top and hold it against the guide 78. Adjacent to the outer finger 182 is a reciprocating stop finger 183. This is carried by a rod 184 provided on its ends with sleeves 185, 185, which are connected together by a rod 187 and are guided on pins 186, 186 carried by the reciprocating frame 179. The rods 184 and 187 constitute a frame carrying the stop-finger 183, and this is reciprocated by a bell-crank 189 having a forked end engaging collars on a projection 188 from the rod 187.

The operation of the fingers 182, 182 and 183 is so timed with reference to the feeding of the box on the apron and the stop finger 79 at the other side, that the stops 79 and 183 are simultaneously projected so as to extend beyond the side edges of the box and arrest it, and the fingers 182, 182 are then projected to impinge against the side of the box and hold it firmly against the guide 78 while the top paper is being applied. After the top is applied the fingers 182, 182 are retracted, releasing the box and allowing the topped box to be carried off by the apron 66. After this box has passed the stop-fingers 79 and 183 which have also been retracted they are again projected to arrest the next box.

To release the paper from the traveling grippers 39 and 40 after they have drawn the paper over the top of the arrested box, I employ a finger 190 which is adjustably carried in a bracket 191 of the slide-frame 179 and is adapted to strike the upwardly projecting arm 64$^a$ of the spring-catch 64 when the cross-bar 62 reaches the end of its forward movement. This will rock the catch 64 against the action of its spring 64$^b$ and release the lug 65. The spring 46 will then act to rock back the arm 60 withdrawing the slide 63 and causing the jaws 39 and 40 to open by an action the reverse of that described in closing. At this moment the brushes come into action to smooth the pasted surface of the paper on the box and the knife 28 descends to sever the inner edge of the pasted portion from the web, the web being at that time however clamped again by the grippers 26, 27. To accomplish this result it is necessary to impart a slight reciprocation of the frame 67 which carries the grippers 26, 27 and cutter 28, on its guides 67$^a$. This is accomplished by the reciprocation of the rods 69 to which the sleeves 68 of the slide 67 are secured. To this end the extremities of the rods 69 are connected with the forked ends of rocking arms 192 mounted on the shaft 195. The movements of the rods 69 are limited by adjustable stops 193, 195$^a$ on a rod 196 guided in a sleeve 194 on one of the bearings 71$^a$.

The rocking of the shaft 59 to cause the cam 58 to act on the arm 57 in the manner heretofore described and also to rock the arms which carry the brushes, is effected by the vertical rack 93 which acts at its upper end on a pinion 92 carried by the shaft 59. The rack is operated by a rod 91 as is described hereafter.

127 is the cam-shaft which carries the series of cams by which the different operations are controlled. It is preferably journaled in an oil box 128 in the base of the machine as shown (Figs. 2 and 4).

106 is the main driving shaft which extends longitudinally in the frame of the machine and is driven from the belt 129 through pulleys 131. On the inner end of the main-driving shaft 106 is a bevel-gear 132 which engages a bevel-gear 133 on a transverse shaft 134 journaled in the frame. On one end of this shaft 134 is a gear 135 which transmits power to a counter-shaft 137 through a gear 136. On the other end of the counter-shaft 137 is a gear 138 which engages a gear 139 on a shaft 140, and through the train of gears 141, 142, 143 and 144 power is transmitted to the cam shaft 127 (see Figs. 2, 17 and 18).

145 is a clutch on the shaft 137 which is controlled by suitable well known connections, as shown in Fig. 17, by a foot-lever 146. This clutch is so arranged that when the lever is depressed the shaft 137 will be thrown into driving connection and the cam shaft driven by it will make one complete revolution.

I shall now refer to the cams and their connections for driving the various parts of the machine: 147$^a$ is the cam which controls the cutter 28. It operates a lever 148 on the cross shaft 150 connected by a rod 151 with a bell-crank lever 152 which is in turn connected by a rod 153 with a crank 154 carried by one of the arms 30 of the cutter. 147$^b$ is the cam which controls the brushes. It operates a lever 155, the upper end of which is connected with a rod 156 having a yielding connection 157 with one arm 158 of a bell-crank journaled on a cross shaft 160. The other arm 161 of the bell crank is connected by a rod 162, with a rocking arm 163 which, through a slot and pin 164, has an adjustable connection with a segmental rack 165 on the shaft 166. This rack engages a pinion 167 on the sleeve 168, and said sleeve carries a gear 169 which engages the rack 126 which carries the cross-bar 122 and the brushes. The cam 147$^c$ on the other side of the machine transmits its motion through similar devices to the segmental rack 165$^c$ on the shaft 166 and thence through the pinion 167$^c$ and gear 169$^c$ to the rack 61 which carries the traveling grippers. The cam 147$^c$ also controls the operation of the feed rolls 1 and 2 by the shaft 7. This is accomplished in the following manner. The shaft 7 is connected by suitable gears 230 with a gear 231 on the sleeve 168$^a$ (Figs. 2 and 4) and driven by a clutch (not shown) from the gear 169$^c$. This clutch is of well known form which permits the gear 231 to move in one direction only. Thus while the gear 169$^a$ has a rocking motion imparted to it by the rack 165$^c$, as has been described, the gear 231 has an intermittent motion in one direction only and such intermittent motion is imparted through the shaft 7 and gearing described to the feed rolls 1, 2. Cam 147$^d$ is the cam which operates the box carrier or apron 66. It transmits its motion through a lever 170 mounted on the shaft 150. As this is behind the lever 155 of the cam 147$^b$ it is not visible in Fig. 2. This lever is connected by a long rod 171 with one arm of a bell-crank lever 172, the other end of which is connected with a crank 173, which rocks the shaft 160. This shaft carries a segmental rack 174 which drives a gear 175 and this in turn is provided with a bevel-gear which engages with the bevel-gear 176 on the upright shaft 177 by which the bevel-gears 77 are driven to operate the apron 66 as heretofore described.

As the motion imparted by the rack 174 to the gears 175, 176 is a reciprocating movement, a clutch 176$^a$ is interposed between the gear 176 and the shaft. This clutch is arranged so as to drive the shaft in one direction but not in the other, so that an intermittent motion in one direction only will be imparted to the gears 77, 77$^a$ and to the apron 66. Cam 147$^e$ controls the operation of the stop-finger 183. It operates a lever 209 on the shaft 150 which is connected by a rod 210 with the bell-crank 189 which controls the operation of the stop finger 183. Cam 147$^f$ controls the operation of the slide 179 and its gripping fingers 182, 182. It operates an arm 211 connected by a rod 212 with the bell-crank 181. Cam 147$^g$ controls the reciprocation of the rods 69, 69. It operates a lever 213, which is connected by a rod 214 with the arm 215 on the shaft 195 which operates the arms 192. Cam 147$^h$ controls the rocking of the shaft 59. It operates an arm 216 connected by a rod 217 with a lever 218, the outer end of which is connected with the rod 91, heretofore referred to, which carries the rack 93 and rocks the shaft 59 through the pinion 92.

So far as the machine has been described, its operation is as follows: The free edge of the paper is drawn from the roll 3 between the feed rolls 1 and 2 and over the guide rolls 20, 21, 23, 24 and 25 to the grippers 26 and 27 between which the free edge is inserted, the grippers then being in clamping positions. The boxes are placed successively upon the traveling apron and are carried by it transversely through the machine.

In the cycle of operations described the forward side of the box is arrested by the stop fingers 79 and 183 which are at that moment projected. By the action of the cam 58 of the rock shaft the grippers 39 and 40 are then clamped upon the free edge of the paper held in the grippers 26 and 27, and at the same time they are locked in closed position by the engagement of the lug 65 on the slide 68 with the spring catch 64. The grippers 26, 27 are then opened by the action of the cutter arms 30 in the manner described. The gripping fingers 182, 182 are then projected to clamp the box firmly against the plate or guide 78. The paper is then drawn forward over the top of the box by the forward movement of the frame 62 operated by the rack 61. After this the frame 122 is moved forward and back by its rack 126 and the rotating brushes 25 and 26 are brought successively in contact with the paper, rubbing it first with the brush 85 with a forward motion on the forward movement of the rack and then rubbing it with a backward motion with the brush 86 on the return of the frame 122. The cutter 28 then starts to move downward, and as the sleeves 37 on the cutter arms 30 move away from the nuts 38 on the rods 36 the jaws 26 and 27 will be again clamped upon the web of paper, by the action of the springs 33. The further movement of the cutter arms 30 will cause the closed clamping jaws 26, 27 to rock on the shaft 31 as an axis until they rest on the stationary cutter bar 29. At this moment the cutter 28 completes its stroke severing the web of paper between the edge of the box and the jaws 26, 27. A clean cut is assured by the fact that the paper rests on the lower stationary cutter 29 owing to the dropping of the jaws 26, 27. At the same time the frame 62 has reached the end of its forward movement and the finger 190 strikes the arm 64ª and opens the jaws 39, 40 releasing the forward edge of the paper. The clamping fingers are then retracted, and the box is carried out by the apron 66, the stops 79 and 183 having been meanwhile retracted.

As the cutter 28 rises it lifts the jaws 26 and 27 from the cutter 29 into normal stationary position. At this time the slide 67 is retracted. Meanwhile the frame 62 moves back into position to again clamp the edge of the paper. The frame 67 is projected to bring the jaws 26, 27 into position between the opened jaws 39, 40. This movement of the frame 67 projects the stop 79. The stop 183 at the other side has also been projected. The next box on the apron 66 is arrested and the operations described are repeated.

So far as the machine has been described, it would be adapted for use with boxes of one size only. It is highly desirable, however, that the machine should be adjustable to boxes of any length, breadth or thickness, and I shall now describe the construction and mode of operation of the devices provided for this purpose.

The frame 74 which carries the rollers 72, 73 for driving the apron 66 is movable vertically in guides 232, 232. It is carried by posts 233, 234 secured to the bottom and acting as guides. The frame 74 is raised and lowered by a hand-wheel 239 on a transverse shaft which drives a longitudinal shaft 241 through suitable gears 240. The shaft 241 carries a pinion 242 which engages a vertical rack 243 carried by the frame (see Figs. 1 and 2). To permit this raising and lowering of the frame 74 and apron 66 without affecting the driving connection a long driving shaft 177 is employed which is keyed to the gear 176, and may move through the gear, when the shaft is raised or lowered.

235 is a hand-wheel on a transverse shaft 236 journaled in a bracket 237 of the main frame and carrying a pinion 238 which engages a rack 244 connected with the frame 179 through the rod 180 (see Fig. 15). By the operation of the hand-wheel 235 the rack 244 may be moved back and forth to adjust the position of the frame 179 and the stop-finger 183 and gripping fingers 182 carried by it to suit the length of the box.

245 is a hand-wheel journaled in a cross frame which carries the guides 71ª. This carries a pinion 246 which engages the vertical rack 93. This rack engages a wide pinion 248, which is carried on the guide rod 123 and which in turn engages a horizontal rack 249. The rack 249 engages a pinion 250 on a transverse shaft 251, which carries two pinions 252 and 253. These respectively engage racks 254 and 255, one above and the other below, so that the rotation of the shaft 251 and its pinions 252 and 253 will move the racks 254 and 255 in opposite directions. These racks carry the fingers 182, 182 at their ends, so that the operation of the hand-wheel will move the fingers 182, 182 nearer together or farther apart to suit the width of the box.

The pinion 248 is fast on the guide-rod 123 and imparts a slight rocking motion thereto. This rod 123 carries a pinion 256, which engages an intermediate pinion 257, which meshes with the rack carrying the finger 79, so that the finger 79 will be moved laterally simultaneously with the lateral adjustment of the finger 183.

On the upper part of the rack 247, and on the other side thereof, is a second rack 258 which engages a pinion 259 on a cross-shaft 260. This shaft 260 carries a pinion 261 which engages a transverse double-faced rack 262, 263. The upper rack 262 engages a pinion 264 which in turn revolves a shaft 265. On this shaft is a pinion 266 which engages a rack 267. This rack carries a slide 268 which moves on guide rods 269 and carries two rods 270, 270 which are connected with a transversely sliding frame 271 which slides on the spindle 4. The roll of paper is supported on the spindle 4 between the disks 272, 272ª. This movement of the frame 271 provides an automatic adjustment of the supporting disk 272 on one side of the spindle. The adjustment of the disk 272ª on the other side of the spindle is effected in the following manner by hand: The frame 271ª is connected by rods 270ª with a cross-head 268ª, which is guided in rods 269ª. 273ª is a set screw for clamping the cross-head 268ª. When the set-screw is loosened the cross-head 268ª and the rods 270ª may be moved on the guide rods 269ª to adjust the frame 271ª and the disk 272ª. The roll of paper must always be in the middle of the machine, so the frame 271ª and disk 272ª are first adjusted by hand to bring them in contact with one side of the paper roll when its center is in the center line of the machine. The other frame 271 and disk 272 are then adjusted automatically in the manner described. It is to be noted that at the same time the stop and clamping fingers have also been automatically adjusted to position to suit the width of the paper to be applied as well as to the box to which it is to be applied. At the same time that these adjustments are made by the operation of the hand wheel 245, an adjustment is automatically made in the power transmitting devices to respond to the change in the size of the box to be topped, and the resulting variation in the speed and extent of movement of the operating parts. This is effected as follows: Connected with the racks 247 and 258 and moving with them is a third rack 273, Fig. 2 which through a suitable train of gears 274 imparts a longitudinal movement to a rack 275 carried by a sliding bar having a second rack 276 at its outer end which operates a toothed segment 277 fast to the shaft 208. 278 is an arm on the shaft 208 which connects to a bar 279. The outer end of this bar is fixed in a slotted portion of the arm 173 on the shaft 160. The adjustment of the connection of the bar 279 in the slotted portion of the arm 173 will vary the stroke of the segment 174 and consequently of the apron 66 which is operated thereby. It is necessary also to vary the speed of the machine to suit the adjustments described and this is effected by the adjustment of the handle 235. When this handle has been operated to move the rack 244 to adjust the frame 179, it operates through a rack 280 on the underside of the gear 229, which carries a small pinion 228 on the shaft 195. This pinion operates a toothed segment 227 on the shaft 166 which carries an arm 226 connected by a rod 225 with a lever 224 fast on the shaft 140. The upper end of the lever 224 is also connected by a rod 223 to one end 222 of a bell-crank on a shaft 208. The other arm 207 of the bell-crank is connected by link 206 with an arm 205 which is connected at 204 with the arms 203ᶜ, 203ᶜ of bell-cranks which are pivoted at 203ᵇ, 203ᵇ. The other arms 203, 203 of the bell-cranks are connected with friction rollers 200 and 200ᵃ which are carried on counter-shafts 201, 201 with freedom to slide thereon. These rollers make contact with the surface of a friction disk 199. The pulleys 131 are carried by a short shaft 201ᵃ on which is mounted a bevel-gear 202ᵃ which meshes with an idler gear 130 on the shaft 106. This meshes with a gear 202 on the short shaft 201 which carries the friction roller 200. The main shaft 106 is thus driven by the friction disk 199 through the friction rollers 200 and 200ᵃ, and their radial adjustment regulates the speed at which the disk and the main shaft 106 are driven. The disk 199 is controlled by a lever to stop or start the machine in the manner well known.

The operation of the handle 235, through the mechanism just described, which rocks the shaft 140, also automatically adjusts the extent of movement of the racks 61 and 126 which control the reciprocations of the traveling grippers and the brushes. This is done in the following manner. Carried by the shaft 140 are two levers 281 (only one of which is visible in Fig. 2). These are connected respectively by slide blocks 282 with slotted portions of the levers 163, which control the movement of the racks 61 and 126 through the segments 165 and 165ᶜ, as has been described. The adjustment of the slide-blocks 282 in the slots regulates the extent of movement of the levers 163 and correspondingly the movement of the racks 61 and 126 and of the grippers and brushes carried thereby.

What I claim is as follows:

1. In a machine for the purpose described, the combination of a pair of paper grippers adapted to grip a web of adhesive paper, a pair of reciprocating grippers adapted to engage the paper held by the first pair of grippers and withdraw the paper therefrom, means to feed the articles to which the paper is to be applied under said paper when drawn out by said reciprocating grippers, and means to apply the adhesive paper to the surface of said articles.

2. In a machine for the purpose described, the combination of a pair of paper grippers adapted to grip a web of adhesive paper, a pair of reciprocating grippers adapted to engage the paper held by the first pair of grippers and withdraw the paper therefrom, means to feed the articles to which the paper is to be applied under said paper when drawn out by said reciprocating grippers, and reciprocating rotating brushes to press the drawn out web of adhesive paper upon the surface of the article fed under said web.

3. In a machine for the purpose described, the combination of a pair of paper grippers adapted to grip a web of adhesive paper, a pair of reciprocating grippers adapted to engage the paper held by the first pair of grippers and withdraw the paper therefrom, means to feed the articles to which the paper is to be applied under said paper when drawn out by said reciprocating grippers, reciprocating rotating brushes to press the drawn out web of adhesive paper upon the surface of the article fed under said web said brushes acting upon the paper in one direction on the forward reciprocation and in the other direction in the opposite reciprocation.

4. In a machine for the purpose described, the combination of a pair of paper grippers adapted to grip a web of adhesive paper, a pair of reciprocating grippers adapted to engage the paper held by the first pair of grippers and withdraw the paper therefrom, means to feed the articles to which the paper is to be applied under said paper when drawn out by said reciprocating grippers, reciprocating rotating brushes to press the drawn out web of adhesive paper upon the surface of the article fed under said web, and means to bring said brushes in contact with said paper on both the forward and backward reciprocation thereof.

5. In a machine for the purpose described, the combination of means for drawing a web of adhesive paper over an article to which the paper is to be applied, a pair of oppositely rotating brushes, means to reciprocate said brushes over said paper, and means to bring said brushes in contact with said paper, one on the forward movement and the other on the backward movement.

6. In a machine for the purpose described, the combination of means for drawing a web of adhesive paper over an article to which the paper is to be applied, a pair of oppositely rotating brushes, means to reciprocate said brushes over said paper, means to bring said brushes in contact with said paper, one on the forward movement and the other on the backward movement, and cutting devices to cut off the inner end of said paper after it has been acted upon by said brushes.

7. In a machine for the purpose described, the combination of means for drawing a web of adhesive paper over an article to which the paper is to be applied, a reciprocating frame moving over said paper, a rocking frame carried by said reciprocating frame, a pair of oppositely rotating brushes carried by said rocking frame, and means to rock said rocking frame during the movement of the reciprocating frame to bring one brush in contact with the paper on the forward reciprocation and the other brush in contact with the paper on the backward reciprocation.

8. In a machine for the purpose described, the combination of a carrier for carrying boxes in succession, reciprocating paper grippers to carry a web of adhesive paper over the tops of the boxes on said carrier, reciprocating means to press the adhesive paper upon the tops of the boxes, and a cutter to sever the web after it has been applied to the top of each box.

9. In a machine for the purpose described, the combination of a carrier for carrying boxes in succession, reciprocating paper grippers to carry a web of adhesive paper over the tops of the boxes on said carrier, reciprocating means to press the adhesive paper upon the tops of the boxes, a cutter to sever the web after it has been applied to the top of each box, and means to release the grippers after the paper has been drawn over each box.

10. In a machine for the purpose described, the combination of a pair of grippers adapted to clamp the edge of a web of adhesive paper, a second pair of reciprocating grippers adapted to seize the edge of the paper while it is clamped by the first pair of grippers, means to open the first pair of grippers after the edge of the paper has been seized by the second pair of grippers, means to close the second pair of grippers to seize the edge of the paper while held by the first pair of grippers, means to reciprocate the second pair of grippers to draw the paper over the top of the box or article to which the paper is to be applied after said grippers have been closed, and reciprocating means to press the web of adhesive paper upon the top of the box when it has been drawn over the same by the second pair of grippers, and means to open said grippers at the end of their forward movement.

11. In a machine for the purpose described, the combination of a pair of grippers adapted to clamp the edge of a web of adhesive paper, a second pair of reciprocating grippers adapted to seize the edge of the paper while it is clamped by the first pair of grippers, means to open the first pair of grippers after the edge of the paper has been seized by the second pair of grippers, means to close the second pair of grippers to seize the edge of the paper while held by the first pair of grippers, means to reciprocate the second pair of grippers to draw the paper over the top of the box or article to which the paper is to be applied after said grippers have been closed, reciprocating means to press the web of adhesive paper upon the top of the box when it has been drawn over the same by the second pair of grippers, consisting of a pair of oppositely rotating brushes, means to reciprocate said brushes over said paper, means to bring said brushes in contact with said paper, one on the forward movement and the other on the backward movement, and means to open said grippers at the end of their forward movement.

12. In a machine for the purpose described, the combination of intermittently operated means to carry boxes or similar articles in succession, means to draw a web of adhesive paper over the top of each box after it has been stopped, reciprocating means to press the web of adhesive paper upon the top of the box, and a cutter to cut off the inner end of the web of said paper after it has been attached to the top of the box.

13. In a machine for the purpose described, the combination of intermittently operated means to carry boxes or similar articles in succession, reciprocating stop devices to stop said boxes one at a time, means to draw a web of adhesive paper over the top of each box after it has been stopped, reciprocating means to press the web of adhesive paper upon the top of the box, and a cutter to cut off the inner end of the web of said paper after it has been attached to the top of the box.

14. In a machine for the purpose described, the combination of intermittently operated means to carry boxes or similar articles in succession, reciprocating stop devices to stop said boxes one at a time, clamping devices to hold said boxes in fixed position after they have been stopped, means to draw a web of adhesive paper over the top of each box after it has been stopped, reciprocating means to press the web of adhesive paper upon the top of the box, and a cutter to cut off the inner end of the web of said paper after it has been attached to the top of the box.

15. In a machine for the purpose described, the combination of an intermittently operated traveling carrier to carry boxes or similar articles in succession, means to draw a web of adhesive paper over the top of each box after it has been stopped, reciprocating means to press the web of adhesive paper upon the top of the box, a cutter to cut off the inner end of the web of said paper after it has been attached to the top of the box, and means to raise and lower said carrier to adjust it to the height of the box to which the paper is to be applied.

16. In a machine for the purpose described, the combination of an intermittently operated traveling carrier to carry boxes or similar articles in succession, means to draw a web of adhesive paper over the top of each box after it has been stopped, reciprocating means to press the web of adhesive paper upon the top of the box, a cutter to cut off the inner end of the web of said paper after it has been attached to the top of the box, and manually controlled means to raise and lower said carrier to adjust it to the height of the box to which the paper is to be applied.

17. In a machine for the purpose described, the combination of an intermittently operated traveling carrier to carry boxes or similar articles in succession, reciprocating stop devices to stop said boxes one at a time, means to draw a web of adhesive paper over the top of each box after it has been stopped, reciprocating means to press the web of adhesive paper upon the top of the box, a cutter to cut off the inner end of the web of said paper after it has been attached to the top of the box, and means to adjust said stop devices laterally to adjust them to the width of the box to which the paper is to be applied.

18. In a machine for the purpose described, the combination of an intermittently operated traveling carrier to carry boxes or similar articles in succession, reciprocating stop devices to stop said boxes one at a time, means to draw a web of adhesive paper over the top of each box after it has been stopped, reciprocating means to press the web of adhesive paper upon the top of the box, a cutter to cut off the inner end of the web of said paper after it has been attached to the top of the box, and manually controlled means to adjust said stop devices laterally to adjust them to the width of the box to which the paper is to be applied.

19. In a machine for the purpose described, the combination of an intermittently operated traveling carrier to carry boxes or similar articles in succession, a laterally adjustable support for a roll of paper, means to draw the paper from said roll over the top of each box after it has been stopped, means to apply an adhesive to the surface of said paper which passes over the boxes, means to press the adhesive surface of said web upon the top of the stopped box, a cutter to cut off the inner end of the web of paper after it has been attached to the top of the box, and means to adjust the support for said paper to suit the width of the web and the width of the box to which said paper is to be applied.

20. In a machine for the purpose described, the combination of an intermittently operated traveling carrier to carry boxes or similar articles in succession, a laterally adjustable support for a roll of paper, means to draw the paper from said roll over the top of each box after it has been stopped, means to apply an adhesive to the surface of said paper which passes over the boxes, means to press the adhesive surface of said web upon the top of the stopped box, a cutter to cut off the inner end of the web of paper after it has been attached to the top of the box, reciprocating stop devices to stop said boxes one at a time, means to adjust said stop devices laterally to adjust them to the width of the box to which the paper is to be applied, and means to adjust the support for said roll of paper relatively to the adjustment of said stop devices and the width of the boxes.

21. In a machine for the purpose described, the combination of an intermittently operated traveling carrier to carry boxes or similar articles in succession, a laterally adjustable support for a roll of paper, means to draw the paper from said roll over the top of each box after it has been stopped, means to apply an adhesive to the surface of said paper which passes over the boxes, means to press the adhesive surface of said web upon the top of the stopped box, a cutter to cut off the inner end of the web of paper after it has been attached to the top of the box, reciprocating stop devices to stop said boxes one at a time, means to adjust said stop devices laterally to adjust them to the width of the box to which the paper is to be applied, and means to adjust the support for said roll of paper relatively to the adjustment of said stop devices and the width of the boxes, and manually controlled devices for simultaneously and correspondingly moving said means for adjusting the stop devices and the support for the paper roll.

22. In a machine for the purpose described, the combination of an intermittently operated traveling carrier to carry boxes or similar articles in succession, means to draw a web of adhesive paper over the top of each box after it has stopped, reciprocating means to press the web of adhesive paper on the top of the box, a cutter to cut off the inner end of the web of said paper after it has been attached to the top of the box, and clamping devices to hold said boxes in fixed position while the paper is being applied.

23. In a machine for the purpose described, the combination of an intermittently operated traveling carrier to carry boxes or similar articles in succession, means to draw a web of adhesive paper over the top of each box after it has stopped, reciprocating means to press the web of adhesive paper on the top of the box, a cutter to cut off the inner end of the web of said paper after it has been attached to the top of the box, and reciprocating clamping devices to hold said boxes in fixed position while the paper is being applied, and means to adjust said clamping devices longitudinally to suit the length of the boxes to be applied.

24. In a machine for the purpose described, the combination of an intermittently operated traveling carrier to carry boxes or similar articles in succession, means to draw a web of adhesive paper over the top of each box after it has stopped, reciprocating means to press the web of adhesive paper on the top of the box, a cutter to cut off the inner end of the web of said paper after it has been attached to the top of the box, and reciprocating clamping devices to hold said boxes in fixed position while the paper is being applied, means to adjust said clamping devices longitudinally to suit the length of the boxes to be applied, and automatic devices for varying the strokes of the means for drawing the paper web and for pressing it on the box in proportion to the adjustment of the clamping devices.

25. In a machine for the purpose described, the combination of an intermittently operated traveling carrier to carry boxes or similar articles in succession, means to draw a web of adhesive paper over the top of each box after it has stopped, reciprocating means to press the web of adhesive paper on the top of the box, a cutter to cut off the inner end of the web of said paper after it has been attached to the top of the box, reciprocating clamping devices to hold said boxes in fixed position while the paper is being applied, means to adjust said clamping devices longitudinally to suit the length of the boxes to be applied, and automatic devices for varying the strokes of the means for drawing the paper web and for pressing it on the box in proportion to the adjustment of the clamping devices, and manually controlled means for operating both means to adjust the box clamping devices and stroke controlling devices.

In testimony of which invention, I hereunto set my hand.

FERDINAND G. HENRY.

Witnesses:
ERNEST HOWARD HUNTER,
R. M. KELLY

Copies of this patent may be obtained for five cents each, by addressing the "Commissioner of Patents, Washington, D. C."